US010698441B2

(12) United States Patent
Cali et al.

(10) Patent No.: US 10,698,441 B2
(45) Date of Patent: Jun. 30, 2020

(54) HIGH-FREQUENCY CLOCK DISTRIBUTION AND ALIGNMENT SYSTEM

(71) Applicant: BAE SYSTEMS Information and Electronic Systems Integration Inc., Nashua, NH (US)

(72) Inventors: Joseph D. Cali, Nashua, NH (US); Steven E. Turner, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 162 days.

(21) Appl. No.: 15/984,841

(22) Filed: May 21, 2018

(65) Prior Publication Data
US 2019/0354134 A1 Nov. 21, 2019

(51) Int. Cl.
*G06F 1/00* (2006.01)
*G06F 1/12* (2006.01)
*G06F 1/08* (2006.01)
*G06F 1/10* (2006.01)

(52) U.S. Cl.
CPC .................. *G06F 1/12* (2013.01); *G06F 1/08* (2013.01); *G06F 1/10* (2013.01)

(58) Field of Classification Search
None
See application file for complete search history.

(56) References Cited

U.S. PATENT DOCUMENTS

| 2002/0033738 A1* | 3/2002 | Saeki | H03L 7/081 331/17 |
| 2008/0174347 A1* | 7/2008 | Oshima | G06F 1/12 327/145 |
| 2011/0089982 A1* | 4/2011 | Hsieh | H03L 7/091 327/156 |
| 2011/0304367 A1* | 12/2011 | Oh | H03L 7/087 327/157 |
| 2014/0103977 A1* | 4/2014 | Yao | H03L 7/18 327/159 |
| 2018/0110018 A1* | 4/2018 | Yu | H04B 5/0081 |

* cited by examiner

*Primary Examiner* — Nitin C Patel
(74) *Attorney, Agent, or Firm* — Finch & Maloney PLLC; Scott J. Asmus

(57) ABSTRACT

A clock distribution and alignment system includes at least three clock generators, each including a clock receiver circuit to receive a first clock signal having a first frequency, and a clock divider circuit to divide the received first clock signal into a second clock signal having a second frequency lower than the first frequency, each of two or more of the clock generators further including a phase detector circuit to compare the phase of the second clock signal with the phase of the second clock signal for a next one of the clock generators, and a clock adjuster circuit to adjust the phase of the received first clock signal based on the compared phases of the second clock signals. In some cases, the clock adjuster circuit is further to align the phases of the second clock signals to within a predefined tolerance of each other.

20 Claims, 10 Drawing Sheets

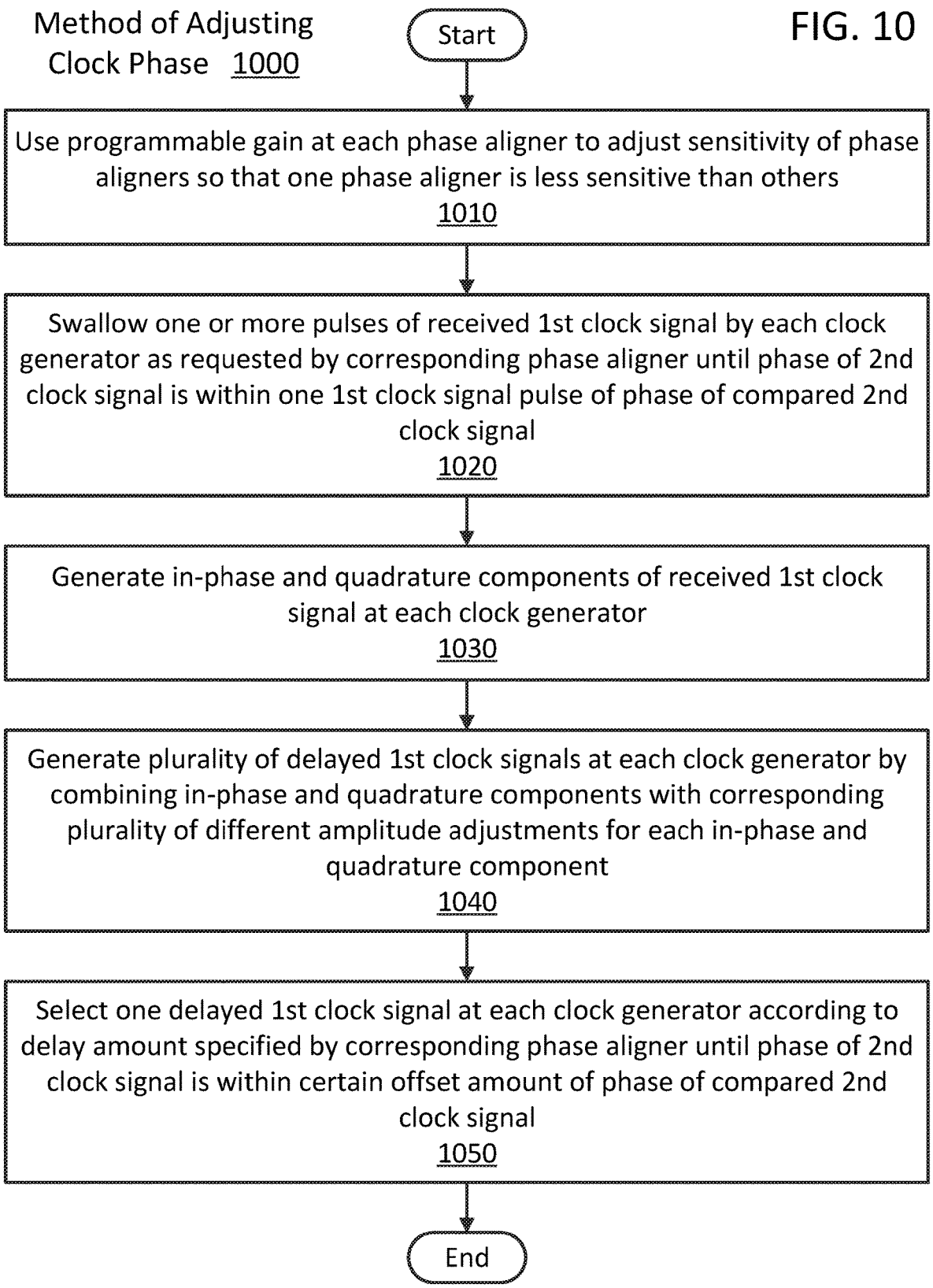

HIGH-FREQUENCY CLOCK DISTRIBUTION AND ALIGNMENT SYSTEM

STATEMENT REGARDING FEDERALLY SPONSORED RESEARCH OR DEVELOPMENT

This invention was made with government support under contract HR0011-15-C-0103 awarded by DARPA. The government has certain rights in the invention.

FIELD OF THE DISCLOSURE

This disclosure relates to frequency division circuitry, and more particularly to a clock distribution and alignment system.

BACKGROUND

For some electronic applications, such as synchronous digital circuits and high-frequency interleaved data converters, numerous dispersed computing components are synchronized to a common clock signal. The different components, for example, can operate at various frequencies that are divisors of the common clock frequency. There are a number of non-trivial issues associated with maintaining efficient synchronization of remote high-frequency clock dividers.

BRIEF DESCRIPTION OF THE DRAWINGS

FIG. 10 is a flow diagram of an example method of adjusting a clock phase, such as for the method of clock distribution and alignment of FIG. 9, according to an embodiment of the present disclosure.

Figure 1:
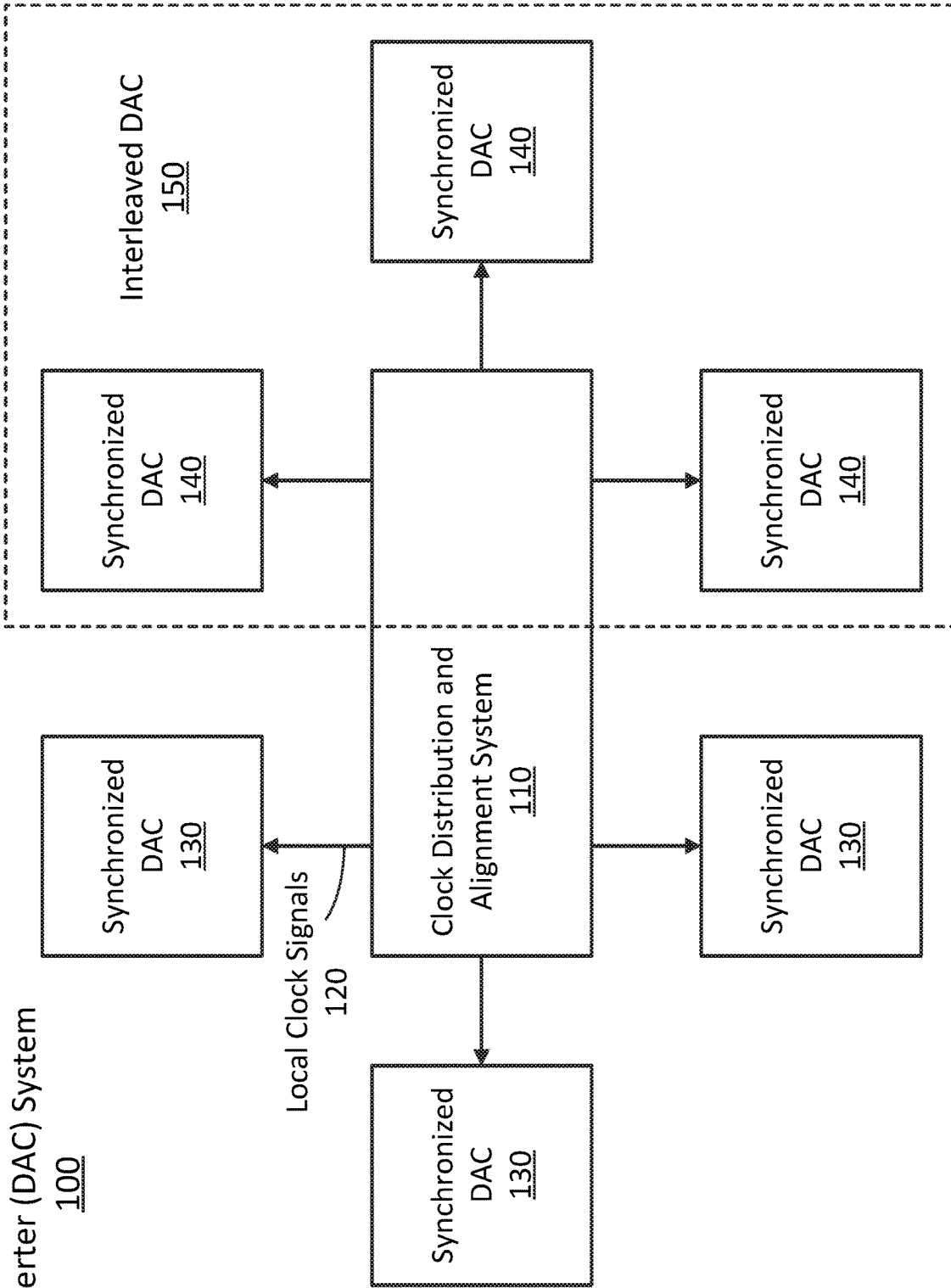
FIG. 1 is a block diagram of an example interleaved digital-to-analog conversion (DAC) system, according to an embodiment of the present disclosure.

Although the following Detailed Description will proceed with reference being made to illustrative embodiments, many alternatives, modifications, and variations thereof will be apparent to those in light of the present disclosure.

DETAILED DESCRIPTION

According to one or more embodiments of the present disclosure, a high-frequency clock distribution and alignment system is provided. The system includes numerous dispersed clock generators each driven by a common high-frequency clock signal. Each clock generator divides the common clock signal into one or more lower frequency clock signals for driving nearby circuits. The smallest (or lowest) frequency clock signal of these lower frequency clock signals also serves as a reference clock signal for synchronizing the clock generators. To this end, in one or more embodiments, the system includes a phase aligner for each clock generator. The phase aligner compares the phase of the reference clock signal of a first clock generator to the phase of the reference clock signal of a second (e.g., nearby, neighboring) clock generator. In addition, the phase aligner adjusts the common clock signal (as received in the clock generator) to align the phases of the reference clock signals.

General Overview

As mentioned above, there are a number of non-trivial issues associated with maintaining efficient synchronization of remote high-frequency clock dividers. For example, in high speed, large bit-width digital-to-analog converters (DACs), data can be generated from lower clock frequency circuits, such as 500 megahertz (MHz) processing cores or other circuits. The core DAC circuitry may, however, be driven at a much higher frequency, such as 16 gigahertz (GHz). Accordingly, the data from the numerous sources (e.g., 500 MHz) may be assembled by passing through a high-speed serializing multiplexer network that presents the data to the core DAC circuitry. For instance, the multiplexers in the multiplexer network can operate with multiple intermediate frequency clocks that are all synchronized as the data serializes in stages. As an example, data generated from 500 MHz processing cores, such as complementary metal oxide semiconductor (CMOS) cores, can be multiplexed in stages to 1 GHz, then 2 GHz, then 4 GHz, then 8 GHz, and finally 16 GHz. The 16 GHz data can then drive a 16 GHz DAC circuit. Interleaving several such DACs can exacerbate this clock synchronization problem as the total number of circuits and corresponding diverse clock signals spread over larger portions of the integrated circuit (IC). For example, distributing a large number of separate clock signals (such as six different frequency clock signals in the above scenario) introduces significant characterization issues to keep these clock signals all synchronized over the entire IC.

Accordingly, and in various embodiments of the present disclosure, a single (or common) high-speed (e.g., 16 GHz, 20 GHz) clock signal is distributed over the IC to a number of local clock generator circuits. Clock division and synchronization takes place at the local level, which works well in heterogeneous integration cases where a large physical distance must be traversed for multiple synchronous clock domains. Each local clock generator can receive the global clock signal and divide the received signal into one or more lower frequency clock signals for driving local circuits (e.g., close to the local clock divider). In some such embodiments, one of these divided clock signals (such as the smallest frequency or reference clock signal, e.g., 500 MHz, 625 MHz) is also used as a reference clock signal to synchronize the different local clock generators.

For instance, in one or more such embodiments, a phase aligner is provided. The phase aligner compares the phase of the reference clock signal from one clock generator (first clock generator) with the phase of the reference clock signal of another clock generator (second clock generator). For example, the phase aligner can be physically equidistant to the first and second clock generators. The phase aligner can then adjust the received global clock signal at the first clock generator based on the phase comparison. This adjustment (or adjustments) causes a corresponding change in the phase in the reference clock signal generated by the first clock generator, so as to synchronize the phases of the two reference clock signals. In some embodiments, numerous such phase aligners are arranged in a cascaded fashion to align different corresponding pairs of reference clock signals. The reference clock signals of all the local clock generators can be aligned by such a process.

In some embodiments of the present disclosure, a clock distribution and alignment system includes a distributed all-digital phase alignment loop that measures phase deltas at the lowest clock frequency. In some such embodiments, phase adjustments are made through a combination of coarse adjustment hardware (such as a pulse swallow circuit at the local clock divider) and fine adjustment hardware (such as an in-phase and quadrature (IQ) phase blender). In some such embodiments, each clock generator has a corresponding phase aligner for adjusting the received global clock signal. The phase aligner performs the adjusting by comparing the phase of the generated lowest frequency clock signal with that of a nearby or neighboring clock generator. The phase aligner can then adjust the received global clock signal to align the phases of the two reference clock signals. In some such embodiments, each clock generator is adjusted by a corresponding phase aligner. In addition, each clock generator also supplies a reference clock signal to another phase aligner for adjusting another clock generator. As such, each phase aligner can align a different pair of clock generators, and the phase aligners can pairwise align all the clock generators in a cascaded fashion.

In one or more embodiments, each phase aligner has a programmable gain to adjust the sensitivity of the phase detection, which can be used to prevent deadlock or inability of the phase aligners to stabilize. For example, the gains are chosen so that stability of the cascaded control loops is maintained. In some embodiments, the phase aligners pairwise align the phases of the reference clock signals of the clock generators until the phases of the reference clock signals are within a certain offset amount (tolerance) of each other. The offset amount or tolerance can be application specific, such as an amount that the clock signals of the local circuits can drift from the corresponding clock signals of neighboring circuits, and the system still maintain synchronization and function correctly. For example, the offset amount might be a fraction (e.g., less than one quarter or less than one sixteenth) of a global clock signal pulse. In some embodiments, the phase detector is a bang-bang phase detector, such as an Alexander phase detector. In one or more embodiments, the clock generator delays the received global clock signal (for instance, by a fraction of a global clock cycle, such as one-64th of the global clock signal pulse) by using a phase blender. The phase blender generates a number of delayed versions of the received global clock signal by combining the in-phase and quadrature components with corresponding different amplitude adjustments.

Numerous other embodiments and configurations will be apparent in light of this disclosure.

System Architecture

FIG. 1 is a block diagram of an example interleaved digital-to-analog conversion (DAC) system 100, according to an embodiment of the present disclosure. The interleaved DAC system 100 and other components described throughout can be fabricated, for example, as an integrated circuit (IC) using IC fabrication techniques such as photolithography.

Referring to FIG. 1, the interleaved DAC system 100 includes a clock distribution and alignment system 110, which generates and distributes numerous (six as shown) sets of local clock signals 120. Each set of local clock signals 120 drives a different synchronized digital-to-analog converter (DAC), such as one of the synchronized DACs 130 or the synchronized DACs 140. The local clock signals 120 also drive various circuits associated with the synchronized DACs. These circuit can include processing circuits to generate the digital data, and multiplexers to convert the combined data rate output from the individual processing circuits to the DAC speed. Groups of synchronized DACs (such as the synchronized DACs 140) form an interleaved DAC 150. In this case, data processing is interleaved among three different streams, one for each synchronized DAC 140. However, the synchronized DACs function in parallel, with all the clock signals 120 being synchronized. Embodiments of the clock distribution and alignment system 110 and its circuit and techniques will be described in further detail with reference to FIGS. 2-10.

Figure 2:
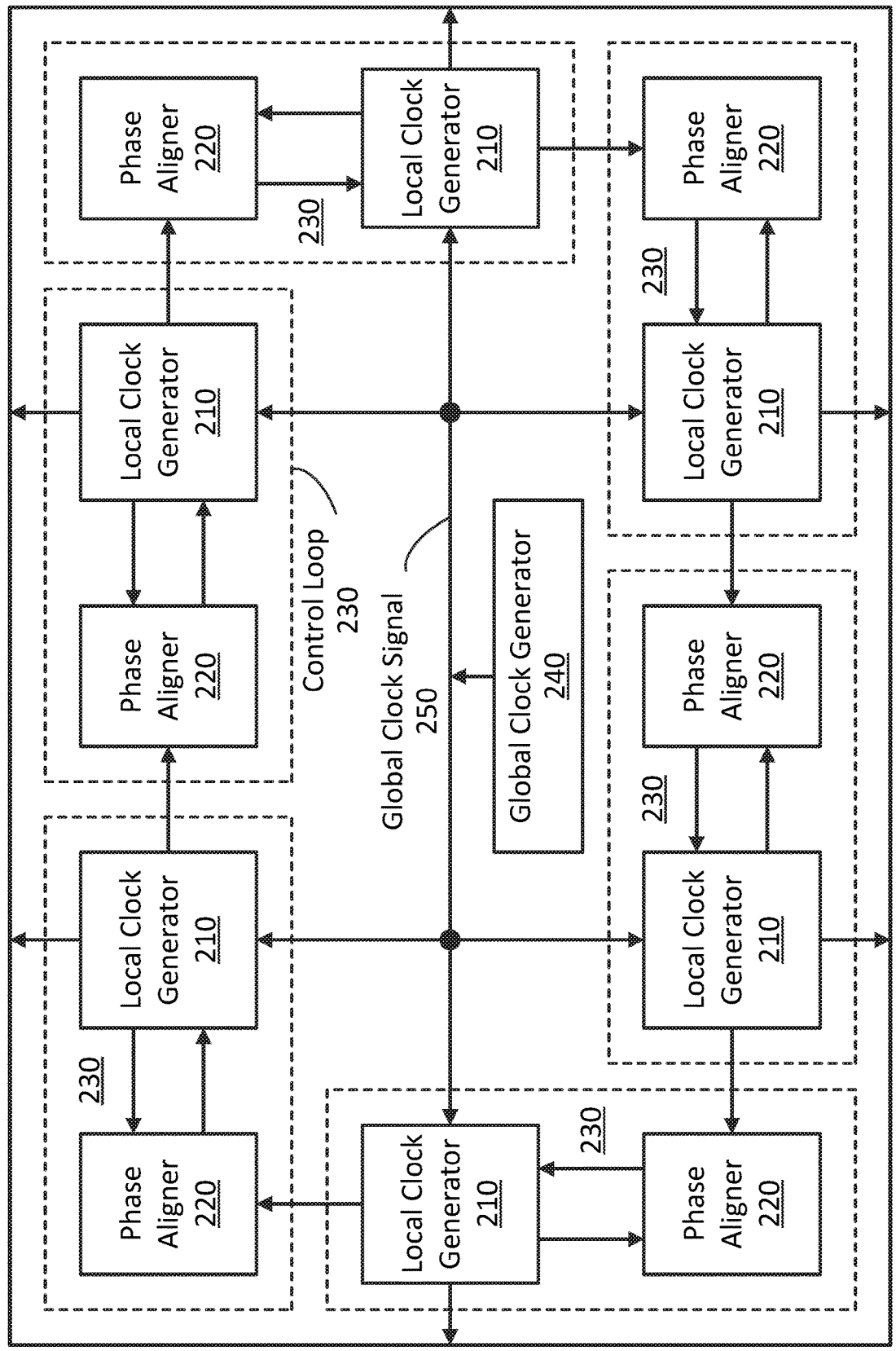
FIG. 2 is a block diagram of an example clock distribution and alignment system, such as for use with the interleaved DAC system of FIG. 1, according to an embodiment of the present disclosure.

FIG. 2 is a block diagram of an example clock distribution and alignment system 200, such as for use with the interleaved DAC system 100 of FIG. 1, according to an embodiment of the present disclosure. The clock distribution and alignment system 200 and other electronic components or circuits described herein can be implemented as an integrated circuit in a semiconductor fabrication technology, such as complementary metal-oxide semiconductor (CMOS) or n-type MOS (NMOS), to name a few.

For example, the clock distribution and alignment system 200 and other circuits disclosed herein may be custom hardware circuits or computer circuits configured (e.g., through predefined or customized logic, to name a few) to carry out the tasks assigned to the circuit. While circuits are illustrated as being made up of other circuits by function, in other embodiments, two or more circuits may be combined into a single circuit performing the functionality of the two or more circuits. In still other embodiments, a single circuit can be divided into two or more circuits, each performing separate functions performed by the single circuit. As will be further appreciated, a circuit as used herein is a physical structure capable of carrying out one or more functionalities as variously provided herein. For example, the structure can be hardware such as purpose-built semiconductor (e.g., gate-level logic or application specific integrated circuit) or a printed circuit board populated with discrete components configured and arranged to carry out the various functionalities provided herein. Numerous such embodiments and configurations will be appreciated in light of this disclosure Referring to FIG. 2, the clock distribution and alignment system 200 includes six local clock generators 210 and six phase aligners 220. Each local clock generator 210 works with a corresponding phase aligner 220 that together make up one of six control loops 230. A global clock generator 240 generates a global clock signal 250 that is distributed to each local clock generator 210. In some embodiments, the global clock signal 250 travels a similar distance to each of the local clock generators 210. The local clock generators 210 each generate a set of local clock signals 260 (e.g., four, five, or six such signals), such as to drive circuits near the local clock generator 210. The control loops 230 can be arranged in a cascaded fashion, such as a loop of control loops 230, which allows each control loop 230 to synchronize (directly or indirectly) with each of the other control loops 230.

The different sets of local clock signals 260 are all kept synchronized through the actions of the phase aligners 220. Each phase aligner 220 works with its corresponding local clock generator 210 (that is part of the same control loop 230) to keep its local clock signals 260 synchronized with the local clock signals 260 of other local clock generators 210. To this end, each phase aligner 220 receives a reference clock signal from a nearby or neighboring local clock generator 210 to compare with a similar reference clock signal from its local clock generator 210. For example, a nearby or neighboring local clock generator 210 can be one whose generated reference clock signal has to travel just as far to the phase aligner 220 as the reference clock signal from the phase aligner's corresponding local clock generator 210. The phase aligner 220 compares the phases of the pair of reference clock signals and has its local clock generator 210 adjust its received global clock signal 250 to align the phases of the reference clock signals.

In some embodiments, the pairs of clock generators 210 are arranged or cascaded in a ring or loop spans the entire clock distribution and alignment system 200. As such, each of the clock generators 210 directly or indirectly aligns its reference clock signal with the reference clock signals of all the other clock generators 210. For example, if the clock generators 210 are numbered 1, 2, . . . , N, one of the phase aligners 220 can adjust clock generator 1 using the reference clock signal from clock generator 2. Likewise, another phase aligner 220 can adjust clock generator 2 using clock generator 3, and so on, with a last phase aligner 220 adjusting clock generator N using clock generator 1.

Figure 3:
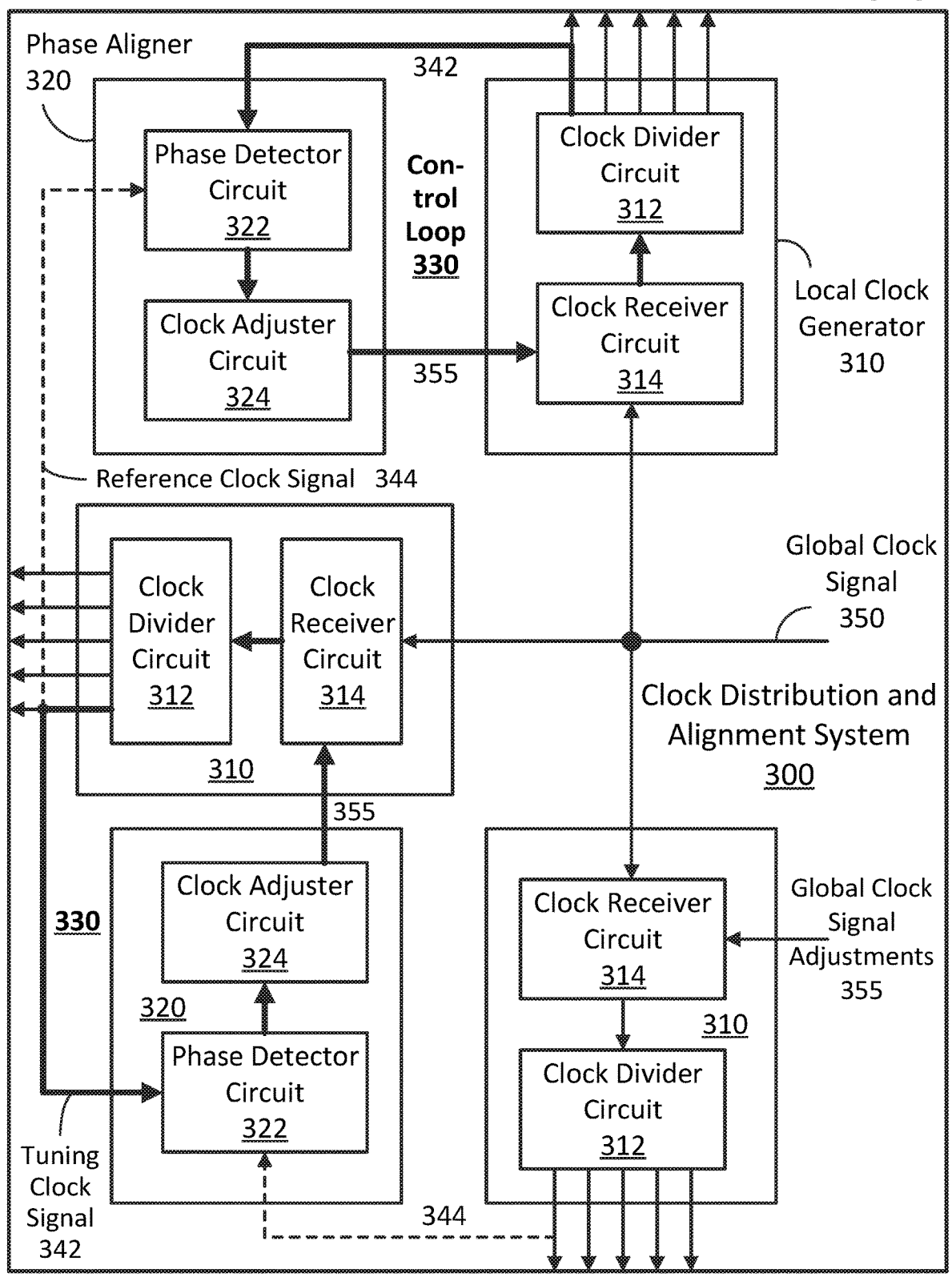
FIG. 3 is a block diagram of a clock distribution and alignment system, such as one side of the clock distribution and alignment system of FIG. 2, according to an embodiment of the present disclosure.

FIG. 3 is a block diagram of a clock distribution and alignment system 300, such as one side (less than half) of the clock distribution and alignment system 200 of FIG. 2, according to an embodiment of the present disclosure. The clock distribution and alignment system 300 includes two complete control loops 330 (with control flow identified by bold arrows). Each control loop 330 includes a local clock generator 310 and a phase aligner 320. A global clock signal 350 is received at each of the local clock generators 310, which each generate a set of local clock signals 360. In the clock distribution and alignment system 300 of FIG. 3, five such local clock signals 360 are generated at each local clock generator 310.

In further detail, each local clock generator 310 includes a clock receiver circuit 314 and a clock divider circuit 312. The clock receiver circuit 314 receives the global clock signal 350 and maintains a copy of the received global clock signal 350 for use in generating the local clock signals 360. Accordingly, the clock receiver circuit 314 can adjust the received global clock signal 350 without the adjustment being reflected in the actual global clock signal 350 (such as the global clock signal 350 received by the other clock receiver circuits 314). Each clock divider circuit 312 divides (such as with a frequency divider) the received global clock signal 350 (as adjusted by the clock receiver circuit 314) into the set of local clock signals 360. For example, if the global clock signal 350 has a frequency of 10 GHz, the clock divider circuit 312 can divide it into four lower frequency clock signals having frequencies of 625 MHz, 1.25 GHz, 2.5 GHz, and 5 GHz. The clock divider circuit 312 can output the local clock signals 360 as five signals having frequencies 625 MHz, 1.25 GHz, 2.5 GHz, 5 GHz, and 10 GHz.

One of the local clock signals 360, such as the lowest frequency local clock signal, is also routed to the phase aligner 320 of the same control loop 330 as the local clock generator 310 that generated the local clock signals 360. In addition to driving local circuits like the other local clock signals 360, this particular local clock signal is used to tune the local clock generator 310, and is referred to and identified as a tuning clock signal 342 in FIG. 3. The phase aligner 320 includes a phase detector circuit 322 and a clock adjuster circuit 324.

The phase detector circuit 322 receives the tuning clock signal 342 from the local clock generator 310 as well as a reference clock signal 344 from the local clock signals 360 of a neighboring control loop 330. Here, the neighboring control loop 330 can be one whose corresponding reference clock signal 344 is routed the same distance to the phase detector circuit 322 as the tuning clock signal 342. This helps lessen the effect of different routing delays when comparing the tuning clock signal 342 and the reference clock signal 344. The reference clock signal 344 has the same frequency as the tuning clock signal 342, but is generated by a different control loop 330. The phase detector circuit 322 is used to measure the effect of adjusting the phase of the tuning clock signal 342 until the tuning clock signal 342 aligns with (e.g., has little to no phase difference with) the reference clock signal 344.

In further detail, the phase detector circuit 322 compares the phase of the tuning clock signal 342 and the phase of the reference clock signal 344, and sends the result of this comparison to the clock adjuster circuit 324. In some embodiments, this comparison is done frequently and the result integrated over time by a signal integrator. In some embodiments, a programmable gain is used to (further) amplify the comparison result. The clock adjuster circuit 324 takes the comparison result and determines if the received global clock signal 350 at the clock receiver circuit 314 should be adjusted (and thus cause a corresponding adjustment to the tuning clock signal 342).

For example, the comparison results can be positive values to indicate the phase of the tuning clock signal 342 is ahead of that of the reference clock signal 344 (e.g., when the phase of the reference clock signal 344 is late). Likewise, the comparison results can be negative values to indicate the phase of the tuning clock signal 342 is behind that of the reference clock signal 344 (e.g., when the phase of the reference clock signal 344 is early). Here, the magnitude of the comparison results can reflect effects such as integration and amplification, which help provide guidance to the clock adjuster circuit 324 as to how much or how frequently to adjust the phase of the tuning clock signal 342

For instance, the clock adjuster circuit 324 can maintain a running total or accumulator of the (possibly integrated and amplified) signed comparison results. In this fashion, when the (signed) accumulator reaches certain values, the clock adjuster circuit 324 aligns the phase of the tuning clock signal 342 with the phase of the reference clock signal 344. For example, the clock adjuster circuit 324 can perform this alignment by adjusting the phase of the tuning clock signal 342. In some embodiments, the clock adjuster circuit 324 adjusts the phase of the tuning clock signal 342 by sending global clock signal adjustments 355 to the clock receiver circuit 314. The clock receiver circuit 314 responds to these global clock signal adjustments 355 by adjusting the received global clock signal 350 accordingly. The adjusted global clock signal is then passed to the clock divider circuit 312, which causes a corresponding adjustment to be made to the phase of the tuning clock signal 342.

Figure 4:
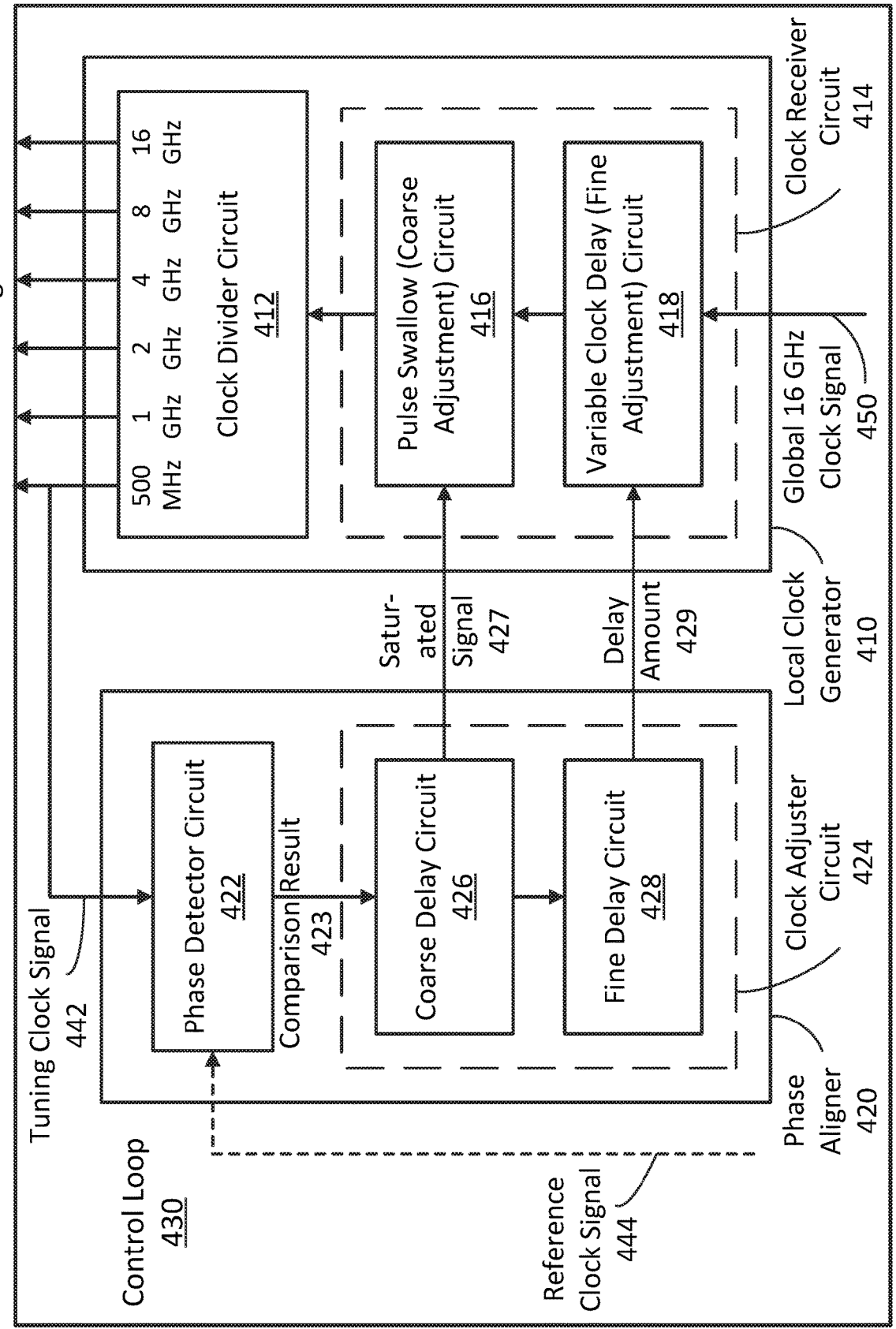
FIG. 4 is a block diagram of an example control loop of a clock distribution and alignment system, such as the clock distribution and alignment system of FIG. 3, according to an embodiment of the present disclosure.

FIG. 4 is a block diagram of an example control loop 430 of a clock distribution and alignment system 400, such as the clock distribution and alignment system 300 of FIG. 3, according to an embodiment of the present disclosure. The clock distribution and alignment system 400 illustrates an example control loop 430 in greater detail than the control loops discussed previously. The control loop 430 includes a local clock generator 410 for receiving a global clock signal 450 (16 GHz in this case) and generating a set of local clock signals 460 (e.g., 500 MHz, 1 GHz, 2 GHz, 4 GHz, 8 GHz, and 16 GHz) from the received global clock signal 450. The control loop 430 further includes a phase aligner 420 for aligning the phase of a tuning clock signal 442 from the local clock generator 410 with a similarly generated reference clock signal 444. The reference clock signal 444 can be generated by another (e.g., nearby or neighboring) control loop. Here, the tuning clock signal 442 (and reference clock signal 444) can be the lowest frequency divided signal from the clock generator 410, in this case 500 MHz.

In further detail, the local clock generator 410 includes a clock receiver circuit 414 and a clock divider circuit 412. The clock receiver circuit 414 includes a variable clock delay (fine adjustment) circuit 418 for delaying the phase of the received global clock signal 450 by a specified delay amount 429 (such as a fraction of a global clock signal pulse). The clock receiver circuit 414 further includes a pulse swallow (coarse adjustment) circuit 416 for swallowing (e.g., nulling, zeroing out) one or more pulses of the received global clock signal 450. The pulse swallow circuit 416 can operate under the stimulus of an outside control signal (such as saturated signal 427) telling the circuit when to swallow a pulse. The effect of the pulse swallow circuit 416 is to reduce the number of clock pulses in the received global clock signal 450, which causes corresponding divided clock signals 460 generated from the received global clock signal 450 to incur a phase delay equal to the number of swallowed pulses. As such, the pulse swallow circuit 416 delays the received global clock signal by larger amounts (e.g., pulses) than the variable clock delay circuit 418 (e.g., fractions of a pulse). As the pulse swallow circuit 416 removes entire pulses from the received global clock signal 450, the pulse swallow circuit 416 is not intended to affect the phase of the received global clock signal 450.

The clock divider circuit 412 takes the received (and adjusted) global clock signal 450 and divides it into several (in this case, six) lower frequency signals 460. For example, the frequencies of the divided clock signals 460 can be power-of-two multiples of the lowest frequency divided clock signal (in this case, 500 MHz). A copy of the lowest frequency clock signal is provided as the tuning clock signal 442 to the phase aligner 420.

The phase aligner 420 includes a phase detector circuit 422 and a clock adjuster circuit 424. The phase detector circuit 422 receives the tuning clock signal 442 and the reference clock signal 444 and compares their phases. For example, the phase detector circuit 422 can be a bang-bang (e.g., Alexander) phase detector that indicates which of the two input signals has an earlier phase than the other. The output of the phase detector circuit 422 can be integrated or amplified (or both) to better measure or adjust to the results bang-bang phase detector. For example, when the phase of the reference clock signal 444 is late (compared to that of the tuning clock signal 442), the output of the bang-bang phase detector can be set to +1. Likewise, when the phase of the reference clock signal 444 is early, the output can be set to −1.

The output of the bang-bang phase detector can be sampled and integrated (e.g., summed) many times over a short interval (such as each iteration of the control loop 430) to provide a signed magnitude version of the comparison result 423. This output can also be amplified (such as by a gain amount) to adjust the sensitivity of the phase detector circuit 422 (or the bandwidth of the control loop 430). The comparison result 423 (possibly integrated and amplified) is input to the clock adjuster circuit 424, which sends control signals to the clock receiver circuit 414 in response.

The clock adjuster circuit 424 includes a coarse delay circuit 426 and a fine delay circuit 428. The comparison result 423 of the phase detector circuit 422 is, for example, accumulated in the phase detector circuit 422. The accumulator may be, for instance, a 20-bit signed integer, that accumulates differences in the phases of the tuning clock signal 442 and the reference clock signal 444 as measured by the phase detector circuit 422. Here, a zero comparison result 423 can indicate that the phases of the tuning clock signal 442 and the reference clock signal 444 are aligned. In addition, positive comparison results 423 can represent that the phase of the reference clock signal 444 is later than that of the tuning clock signal 442. Likewise, negative comparison results 423 can represent that the phase of the reference clock signal 444 is earlier than that of the tuning clock signal 442. The magnitude of the comparison results 423 can represent the amount of difference in the phases of the reference clock signals 444 and the tuning clock signal 442 as measured by the phase detector circuit 422. In some embodiments, the accumulator is a saturating accumulator, which remains at the highest (or lowest) value when encountering an overflow (or underflow) condition.

In various embodiments, the control loop 430 is an all-digital feedback loop. For example, all the circuits in the control loop can be digital logic circuits. In addition, the accumulator can provide feedback for adjusting the phase of the received global clock signal 450 to align the phase of the tuning clock signal 442 with that of the reference clock signal 444. In some embodiments, the possible accumulator values are divided into a number of ranges corresponding to the number of possible delay amounts 429 for controlling the variable clock delay (fine adjustment) circuit 418. For instance, if there are 64 possible parameter values for the delay amount 429, and the accumulator is a 20-bit signed saturating counter, then the accumulator values can be broken into 64 ranges by using the top (high order) six bits of the accumulator ($2^6$=64). The fine delay circuit 428 adjusts the delay amount 429 based on the accumulator value. In this case, the 64 different values can correspond to 64 different delay amounts 429 of the received global clock signal 450. For example, the 64 delay values can range from no delay, to one-64th of the global clock signal pulse, to two-64ths of the global clock signal pulse, and so on to 63-64ths of the global clock signal pulse.

In some embodiments, as the accumulator takes on larger values (representing the phase of the reference clock signal 444 being later than that of the tuning clock signal 442), the delay amount 429 takes on corresponding larger values. The larger delay values 429 further delay the phase of the received global clock signal 450, which delays the phase of the tuning clock signal 442. This brings the phase of the tuning clock signal 442 closer to that of the reference clock signal 444. Alternatively, as the accumulator takes on smaller values (representing the phase of the reference clock signal 444 being earlier than that of the tuning clock signal 442), the delay amount 429 takes on corresponding smaller values. The smaller delay values 429 further lessen the phase delay of the received global clock signal 450, which lessens the delay in the phase of the tuning clock signal 442. This also brings the phase of the tuning clock signal 442 closer to that of the reference clock signal 444. As such, this feedback loop eventually either causes the phase of the tuning clock signal 442 to align with that of the reference clock signal 444, or the accumulator saturates (on either end) and no further change in the delay amount 429 is possible.

Accordingly, in some embodiments, the coarse delay circuit 426 sends a saturated signal 427 to the pulse swallow (coarse adjustment) circuit 416 when the accumulator is saturated (e.g., either too high or too low). The pulse swallow circuit 416 removes entire pulses of the received global clock signal 450, which allows for coarse adjusting of the tuning clock signal 442. The pulse swallowing continues until the accumulator is no longer saturated (e.g., when the phases of the tuning clock signal 442 and the reference clock signal 444 are within one global clock signal pulse). Swallowing a pulse effectively delays the phase of the tuning clock signal 442 by one global clock signal pulse.

For example, when the phase of the reference clock signal 444 is later than that of the tuning clock signal 442, and the accumulator is saturated on the high end, swallowing a pulse moves the phase of the tuning clock signal 442 one global clock pulse closer to that of the reference clock signal 444. Eventually, the pulse swallowing causes the phase of the tuning clock signal 442 to align with or be later than that of the reference clock signal 444, which can stop or reverse the saturation of the accumulator. At this point, the phase of the tuning clock signal 442 is within one global clock signal pulse of the reference clock signal 444. In addition, fine adjustments of the phase of the received global clock signal 450 are then sufficient to align the phases of the tuning clock signal 442 and the reference clock signal 444.

For another example, when the phase of the reference clock signal 444 is earlier than that of the tuning clock signal 442, and the accumulator is saturated on the low end, swallowing a pulse moves the phase of the tuning clock signal 442 one global clock pulse further from (more out of phase than) that of the reference clock signal 444. Eventually, however, the pulse swallowing causes the phase of the tuning clock signal 442 to reach and go past completely out of phase with the phase of the reference clock signal 444. At that point, the phase of the tuning clock signal 442 is earlier than that of the reference clock signal 444 (though they are still almost completely out of phase). This switches the sign of the comparison results 423 from negative to positive, which removes the saturation on the low end. Eventually, though, the accumulator saturates on the high end since the phases of the tuning and reference clock signals 442 and 444 are too far apart for fine adjustment to correct. At that point, the state of the control loop 430 is the same as that of the previous example, and the feedback loop will finish aligning the tuning and reference clock signals 442 and 444 in a similar fashion.

Accordingly, and using the above example embodiment, the feedback structure of the control loop 430 causes the phase aligner to align the phase of the tuning clock signal 442 to within one-64th of a global clock signal pulse of the reference clock signal 444. For a 16 GHz global clock signal 450, this aligns the phases of the two clock signals to within one picosecond (ps) of each other. Speaking more generally, the coarse delay circuit 426 brings the phases of the tuning clock signal 442 and the reference clock signal 444 to within one global clock signal pulse of one another. Further, the fine delay circuit 428 brings the phases of the tuning clock signal 442 and the reference clock signal 444 to within one fine adjustment (fraction of the global clock signal pulse, such as one-64th or one-32nd of the global clock signal pulse) of one another.

Figure 5:
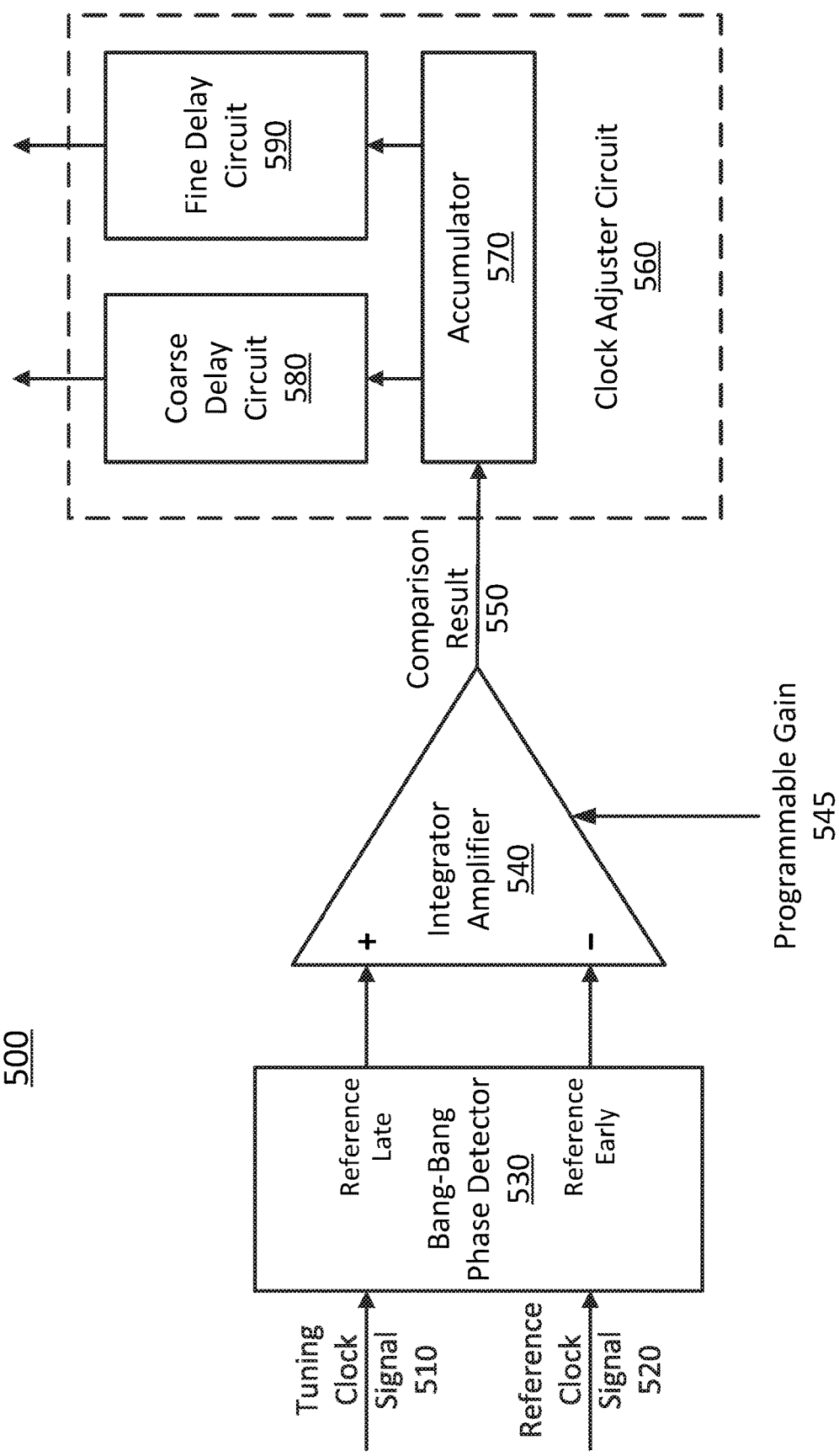
FIG. 5 is a block diagram of an example phase aligner, such as for the control loop of FIG. 4, according to an embodiment of the present disclosure.

FIG. 5 is a block diagram of an example phase aligner 500, such as for the control loop 430 of FIG. 4, according to an embodiment of the present disclosure. The phase aligner 500 includes a bang-bang phase detector 530 (such as an Alexander phase detector) for indicating which of the tuning clock signal 510 and the reference clock signal 520 has an earlier phase. For instance, the bang-bang phase detector 530 can have one output signal to indicate the phase of the reference clock signal 520 is later than that of the tuning clock signal 510 and another output signal to indicate the phase of the reference clock signal 520 is earlier. The output of the bang-bang phase detector 530 is input to an integrator amplifier 540, which integrates the reference late (e.g., +1) and reference early (e.g., −1) signals over time and amplifies the integrated signal according to a programmable gain 545. The integrated and amplified comparison result 550 is output from the integrator amplifier 540.

When the phases of the tuning clock signal 510 and the reference clock signal 520 are aligned (such as within a fraction of the global clock signal pulse), the bang-bang phase detector 530 enters the bang-bang state. In the bang-bang state, the bang-bang phase detector 530 alternately (such as arbitrarily or randomly) indicates one clock signal has an earlier phase, and then indicates the other clock signal has the earlier phase. Accordingly, the integration of the bang-bang phase detector 530 output over time is either very small or zero when the tuning and reference clock signals 510 and 520 are aligned.

It is important to lessen or minimize the risk of deadlock or phase adjustments that never settle, or minor drifting of the phases of adjacent control loop clock signals that may compound over the entire system. Accordingly, in some embodiments, each phase aligner 500 includes a programmable gain, such as the programmable gain 545. The programmable gains 545 are chosen so that stability of the cascaded control loops is maintained. For example, the programmable gain 545 can be set to a different gain amount for different phase aligners 500 (such as to different amounts for adjacent phase aligners 500). In some embodiments, one phase aligner 500 has the smallest gain amount, while the other phase aligners 500 collectively use one or more larger gain amounts.

In some embodiments, the programmable gain 545 is a digital programmable gain circuit in which the gain can be specified digitally (e.g., as one of eight possible binary gain values). In some such embodiments, each gain value corresponds to a different power-of-two (shift value) by which to multiply the corresponding integrated phase detector samples. In some embodiments, different control loop gains are digitally programmed for the phase aligners to effect pairwise alignment and divided clock synchronization while avoiding stability problems. The programmable gain 545 effectively changes the control loop bandwidth (e.g., ability of the control loop to tolerate noise in the phase detector sampling).

The gain 545 is used to amplify the (integrated, or sampled and summed) output of a phase detector (such as the bang-bang phase detector 530) that is used to compare the phases of the reference and tuning clock signals 520 and 510. As such, a higher gain 545 results in a higher sensitivity of the corresponding phase detector 530 while a lower gain 545 results in a lower sensitivity of the corresponding phase detector 530. A more sensitive phase detector 530 (or phase aligner 500) will adjust its corresponding clock signal more quickly (e.g., accumulates larger phase comparison results), but will also be more sensitive to noise and other unintended clock signal effects. A less sensitive phase detector 530 will be slower to adjust its corresponding clock signal (e.g., accumulates smaller phase comparison results), but is also less sensitive to noise and other undesired effects. A less sensitive phase detector 530 also serves as an anchor to stabilize the other control loops having the higher gain values. When one control loop has a lowest gain value, it can help stabilize all the other control loops. A mixture of phase aligners having high gain values and low gain values helps keep the corresponding clock signals responsive to changes (e.g., temperature effects) in local clock rates yet tolerant of undesired effects such as noise.

The remainder of the phase aligner 500 includes a clock adjuster circuit 560 that receives the comparison result 550 from the integrator amplifier 540. The clock adjuster circuit 560 includes an accumulator 570 for accumulating the (signed) comparison results 550 from the bang-bang phase detector 530 (as integrated and amplified by the integrator amplifier 540). The signed value in the accumulator 570 is used to drive a coarse delay circuit 580 for making large (or coarse) adjustments 585 to the phase of the tuning clock signal 510. For example, when the accumulator 570 is saturated on the high end (e.g., overflow) or the low end (e.g., underflow), the coarse delay circuit 580 can issue a saturated signal 585 to the clock generator to make a more significant phase change in the tuning clock signal 510. In some embodiments, the coarse adjustment 585 changes the tuning clock signal 510 sufficiently that the accumulated comparison results 550 no longer cause the accumulator 570 to be saturated.

The value in the accumulator 570 is also used to drive a fine delay circuit 590 for making small (or fine) adjustments (or delay amounts) 595 to the phase of the tuning clock signal 510. For example, the delay amounts 595 can be reflective of the current value of the accumulator 570, such as the high-order bits. In a feedback control loop, as the accumulator keeps accumulating nonzero comparison results 550 (representing corresponding phase differences between the tuning clock signal 510 and the reference clock signal 520), it causes the fine delay circuit 590 to make corresponding changes to the delay amount 595. These delay amount changes cause the phase of the tuning clock signal 510 to move closer to that of the reference clock signal 520, which causes the comparison results 550 to move to (or closer to) zero. This slows down the accumulator 570, which slows down the delay amount 595 changes, and eventually leads to stability (e.g., the most stable delay amount 595 value).

In some embodiments, the negative feedback loop structure of the control loops allows the clock adjuster circuit 560 to be continuously running, making significant changes to the tuning clock signal 510 at some times (e.g., startup), and minor tweaks to the tuning clock signal 510 at other times. Briefly, the fine delay circuit 590 is always directing the clock generator to make small changes to the tuning clock signal 510 that will bring the phase of the tuning clock signal 510 closer to that of the reference clock signal 520. Moreover, the coarse delay circuit 580 is always checking for extreme (e.g., out of range, saturation) conditions with the accumulator 570, to adjust the phase of the tuning clock signal 510 for conditions beyond the ability of the fine delay circuit 590 to address. Because of the effects of coarse adjustment (e.g., pulse swallowing of the received global clock signal) can be somewhat disruptive if performed too frequently, in some embodiments, the coarse delay circuit 580 waits (e.g., for a small period of time or until a next particular increment in time) before issuing a coarse adjustment 585. This allows the saturation condition to perhaps correct itself before coarse adjustment is needed. In some other embodiments, this tempering of coarse adjustment is handled elsewhere in the control loop, such as at the pulse swallow circuit 416 in FIG. 4.

Figure 6:
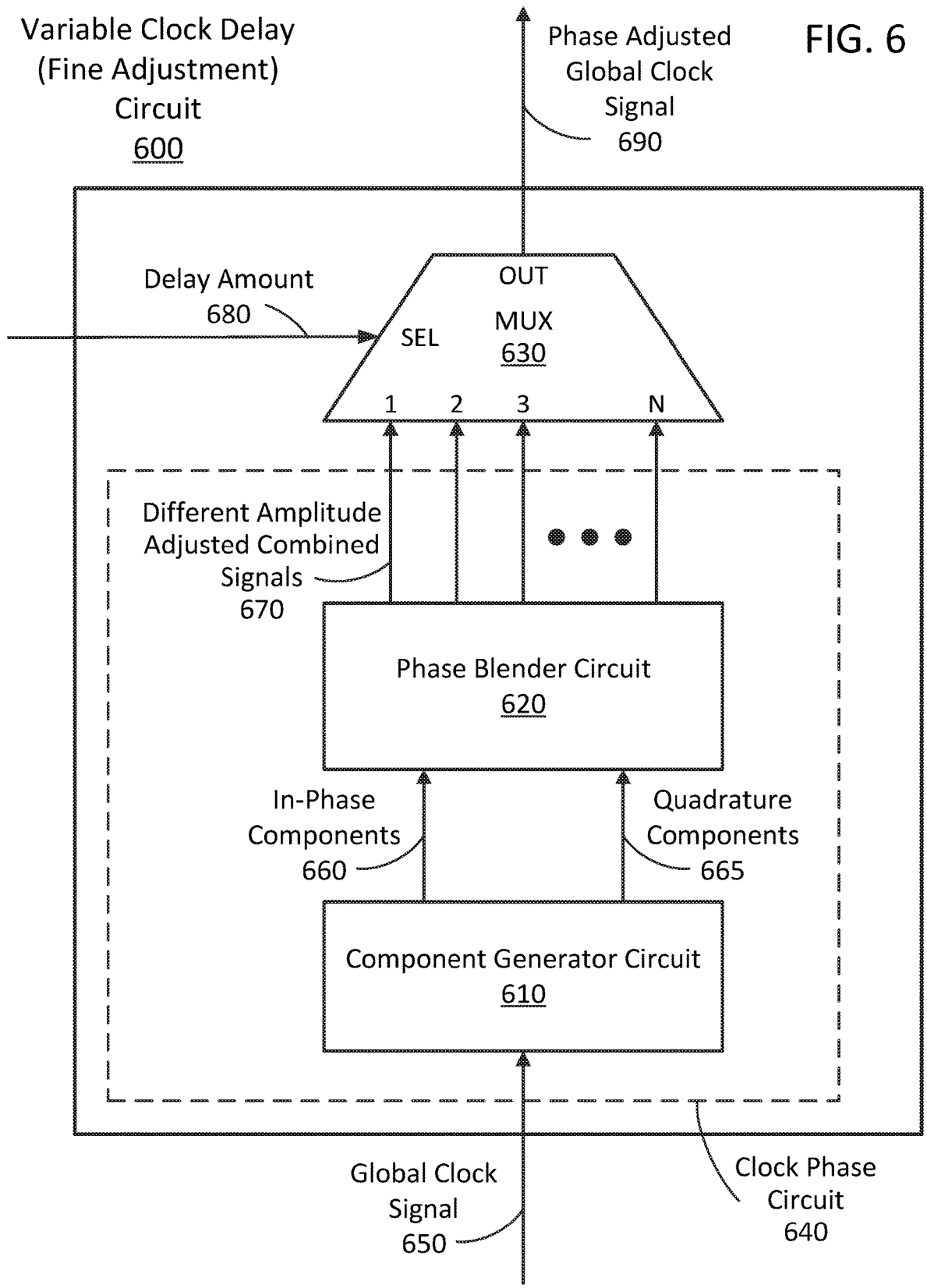
FIG. 6 is a block diagram of an example variable clock delay (fine adjustment) circuit, such as for the control loop of FIG. 4, according to an embodiment of the present disclosure.

FIG. 6 is a block diagram of an example variable clock delay (fine adjustment) circuit 600, such as for the control loop 430 of FIG. 4, according to an embodiment of the present disclosure. The variable clock delay circuit 600 includes a clock phase circuit 640 and a multiplexer 630, and receives a global clock signal 650 as input. The clock phase circuit 640 generates different delayed signals 670 of the global clock signal and sends them to the multiplexer 630. The multiplexer 630 selects the appropriate delayed signal 670 based on a delay amount 680 specified by another circuit, such as the fine delay circuit 590 of FIG. 5, and outputs the selected delayed signal 670 as a phase adjusted global clock signal 690.

In further detail, the clock phase circuit 640 includes a component generator circuit 610 for generating in-phase (I) components 660 (such as 0° and 180°) and quadrature (Q) components 665 (such as 90° and 270°) of the global clock signal 650. The generated I/Q components 660 and 665 are input to a phase blender (or phase interpolator) circuit 620. The phase blender circuit 620 produces a set of different delayed global clock signals 670 by combining the in-phase and quadrature components 660 and 665 with a corresponding set of different amplitude adjustments for each of the in-phase and quadrature components 660 and 665. For example, in some embodiments, signed amplitude adjustments are used for the in-phase and quadrature components 660 and 665 to produce any possible blend of the two signals between 0° and 360°. In this fashion, any delay of the received global clock signal 650 between 0 and a full global clock signal pulse can be generated. For example, 64 evenly spaced increments, each representing a one-64th increment of the global clock signal pulse can be generated, from no delay, to one-64th of the global clock signal pulse delay, to two-64ths of the global clock signal pulse delay, and so on to 63-64ths of the global clock signal pulse delay.

The phase blender topology mixes the two quadrature sinusoids. This topology is particularly low noise for high frequency signals. In the clock distribution path, the slope of the signal through a buffer or sampler is strongly correlated to the amount of noise (jitter) that is transferred to the signal. A slow transitioning signal allows more broadband noise to corrupt the signal while a fast transitioning (higher slope) signal reduces the noise transfer function to the output. This implies that phase blenders (such as the phase blender circuit 620) that operate in this manner naturally tend to be lower noise at high frequencies as the slope sinusoids dV/dt through the transition region are larger.

Figure 7:
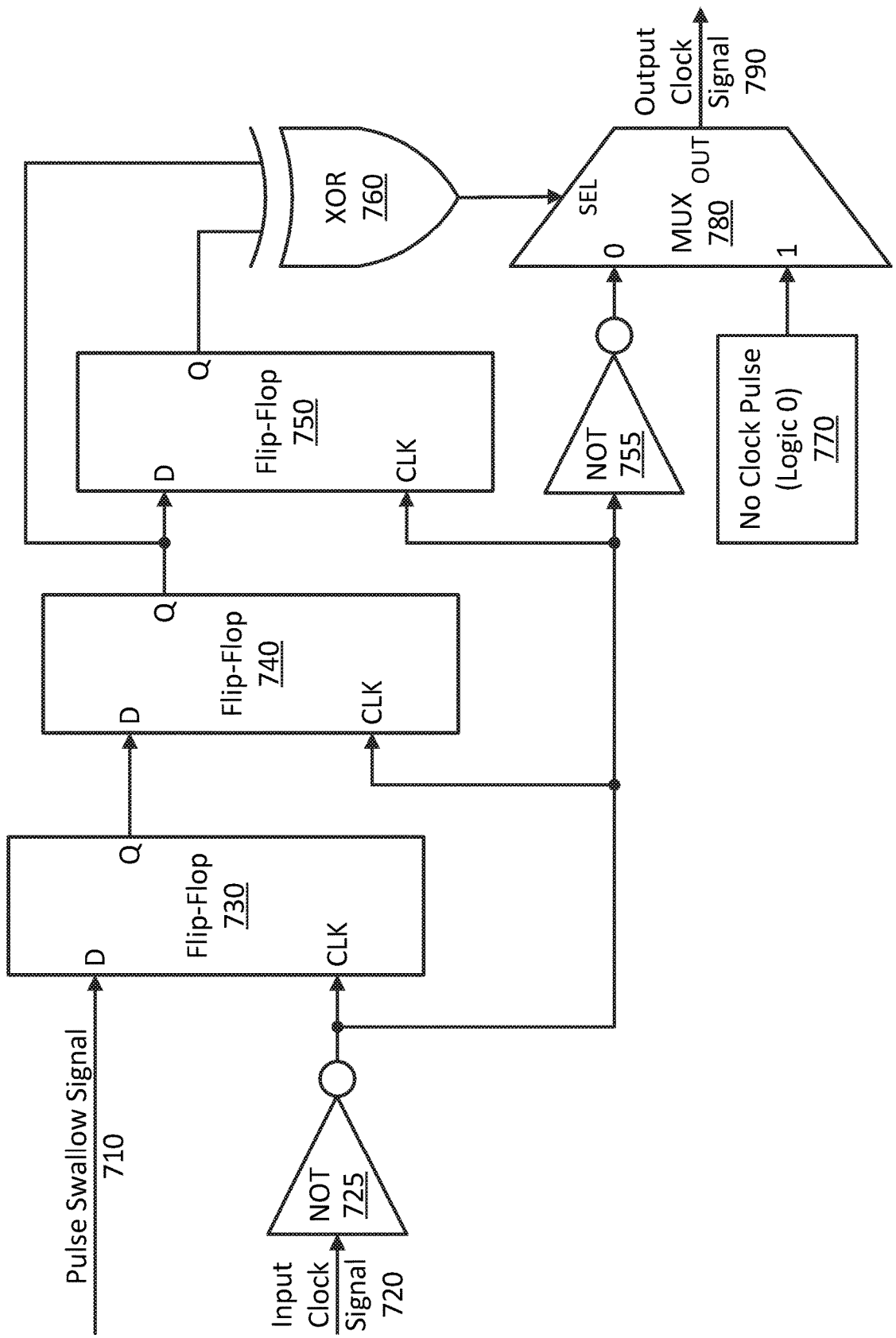
FIG. 7 is a circuit diagram of an example pulse swallow (coarse adjustment) circuit, such as for the control loop of FIG. 4, according to an embodiment of the present disclosure.

FIG. 7 is a circuit diagram of an example pulse swallow (coarse adjustment) circuit 700, such as for the control loop 430 of FIG. 4, according to an embodiment of the present disclosure. The pulse swallow circuit 700 includes two NOT circuits 725 and 755 connected in series, three D-type flip-flops 730, 740, and 750 connected in series, an XOR (exclusive OR) circuit 760, and a multiplexer 780. The pulse swallow circuit receives an input clock signal 720 (such as the received global clock signal of a clock generator), and outputs an output clock signal 790 that closely resembles the input clock signal 720.

More specifically, the multiplexer 780 selects either the input clock signal 720 (or its equivalent, such as being passed through NOT gates 725 and 755) or a logic 0 (no clock pulse) signal 770, as directed by the XOR circuit 760. The XOR circuit 760 identifies a change in state (e.g., 0 to 1, or 1 to 0) in a pulse swallow signal 710 and zero's out a clock pulse (or swallows the pulse) in response to the change in state. Accordingly, the pulse swallow circuit swallows one pulse of the input clock signal for every change in state of the pulse swallow signal 710. The pulse swallow signal 710 can be supplied, for example, by the coarse delay circuit 580 of FIG. 5.

Figure 8:
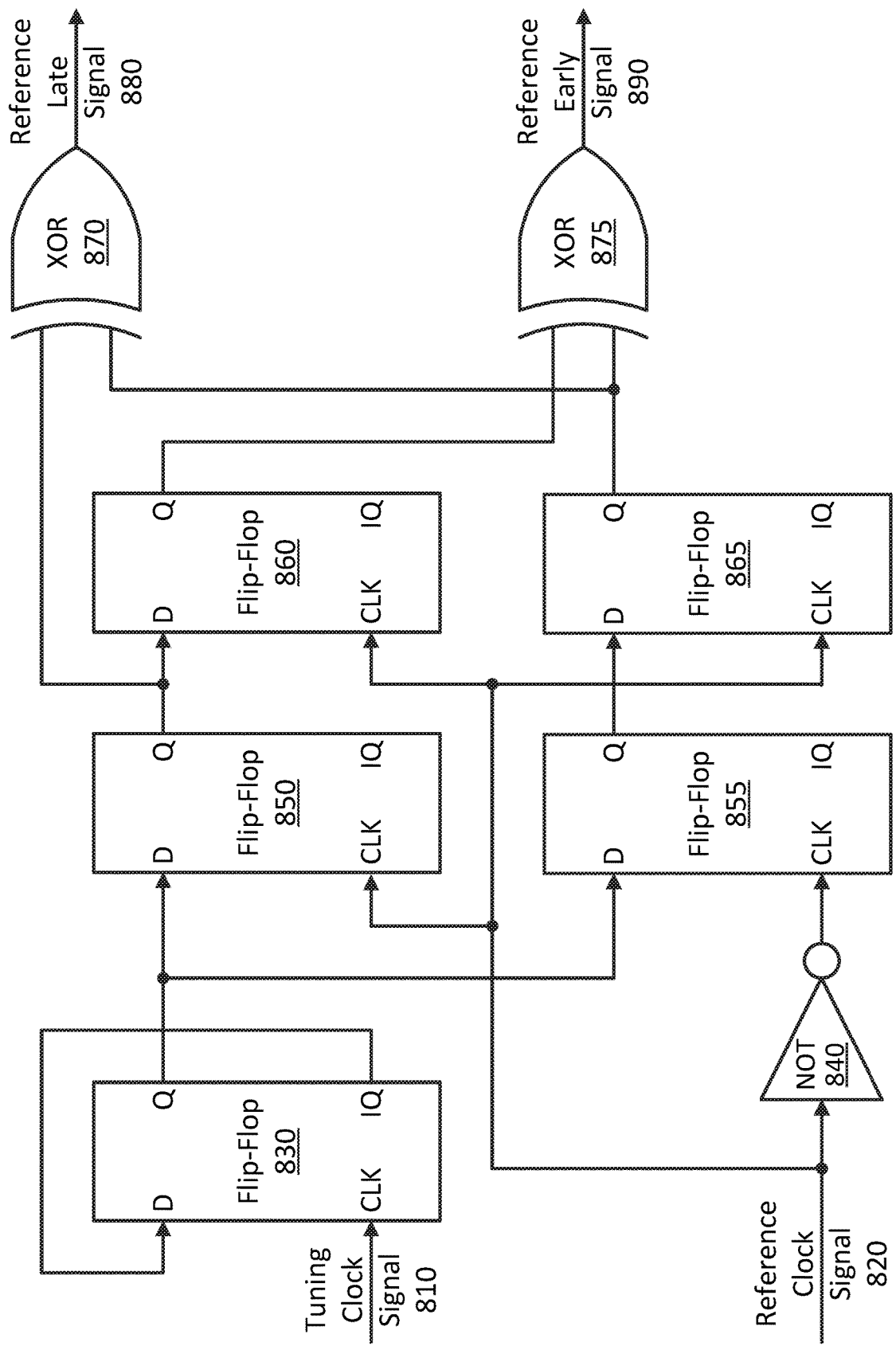
FIG. 8 is a circuit diagram of an example Alexander (bang-bang) phase detector, such as for the control loop of FIG. 4, according to an embodiment of the present disclosure.

FIG. 8 is a circuit diagram of an example Alexander (bang-bang) phase detector 800, such as for the control loop 430 of FIG. 4, according to an embodiment of the present disclosure. Like the pulse swallow circuit 700, the Alexander phase detector 800 is composed of NOT circuits, D-type flip-flops, and XOR circuits. More specifically, the Alexander phase detector includes NOT circuit 840, D flip-flops 830, 850, 855, 860, and 865, and XOR circuits 870 and 875. The Alexander phase detector 800 takes a tuning clock signal 810 and a reference clock signal 820 having the same frequency as input. The Alexander phase detector 800 determines whether the reference clock signal 820 has a later phase or an earlier phase when compared to that of the tuning clock signal 810.

Depending on these determinations, the Alexander phase detector 800 provides a reference late signal 880 (to indicate the phase of the reference clock signal 820 is later than that of the tuning clock signal 810) or otherwise provides a reference early signal 890. When the phases of the tuning clock signal 810 and the reference clock signal 820 are very close, a race condition arises. The race condition is between the flip-flop 830 (driven by the tuning clock signal 810) and the other flip-flops 850, 855, 860, and 865 (driven by the reference clock signal 820). As a result of the race condition, the output of the Alexander phase detector 800 becomes indeterminate (enters a bang-bang state). During the bang-bang state, the output signals of the Alexander phase detector 800 alternate (such as randomly or variably) between indicating the reference clock signal 820 is late and indicating the reference clock signal 820 is early. The alternation is not necessarily strict, nor does it necessarily occur with any regular pattern. The example circuits of FIGS. 1-8 can vary (or not even be included) in different embodiments.

Methodology

Figure 9:
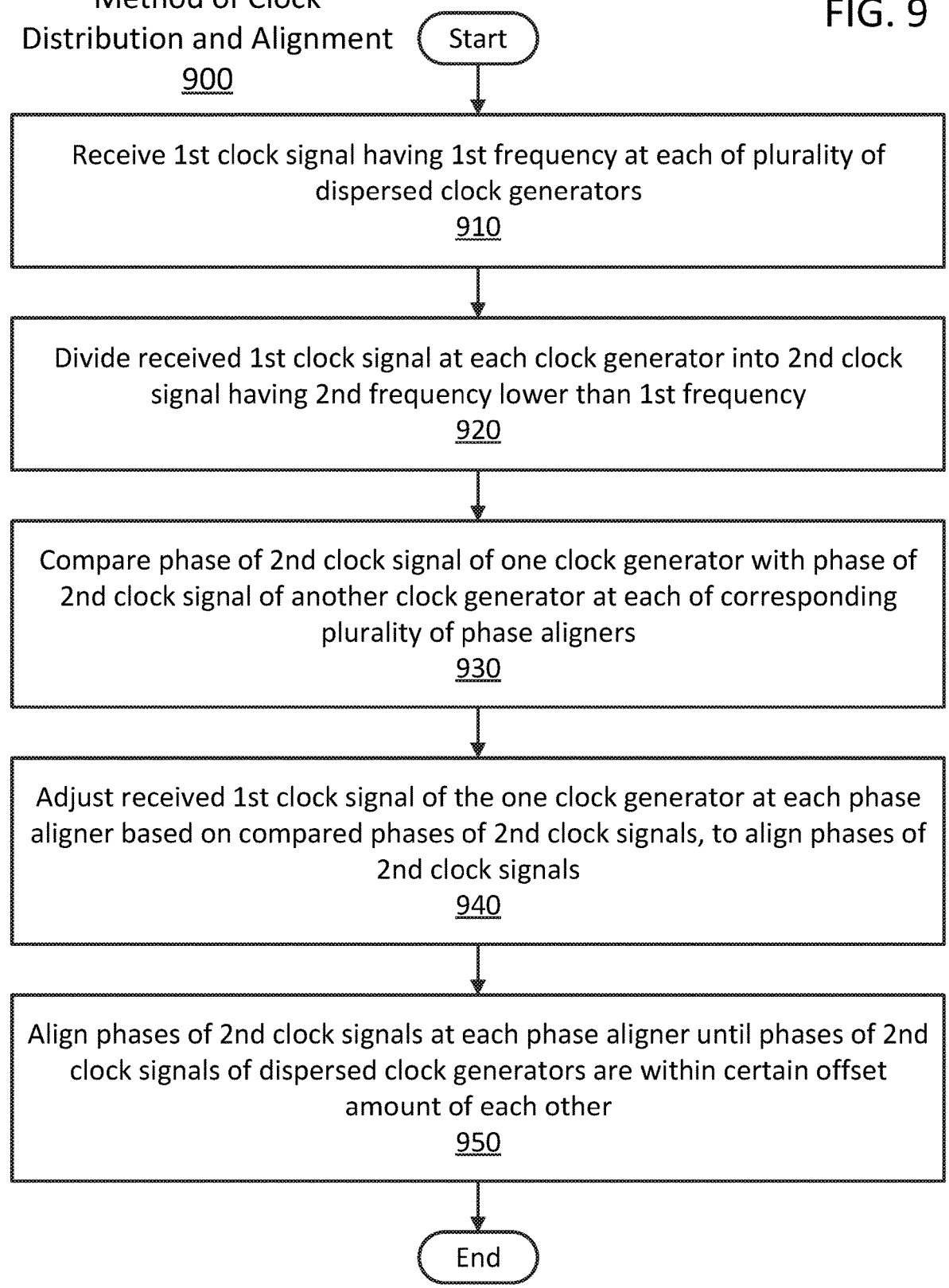
FIG. 9 is a flow diagram of an example method of clock distribution and alignment, according to an embodiment of the present disclosure.

FIG. 9 is a flow diagram of an example method of clock distribution and alignment, according to an embodiment of the present disclosure. The method 900 may be performed, for example, by the clock distribution and alignment systems and components of FIGS. 1-8. More generally, the method 900 and other methods described herein may be implemented in hardware or combinations of hardware and software. For example, the method 900 may be implemented by the clock distribution and alignment system 300 of FIG. 3 or the clock distribution and alignment system 400 of FIG. 4. Throughout the description of the method 900, references may be made to corresponding components of the clock distribution and alignment systems and various circuits of FIGS. 1-8. In another embodiment, the method 900 may be implemented by a custom circuit such as a clock distribution and alignment circuit with custom processing circuits configured to carry out the method 900. In other embodiments, the method 900 may be performed in conjunction with a special purpose processor, such as a signal processor. In addition, while the methods described herein may appear to have a certain order to their operations, other embodiments may not be so limited. Accordingly, the order of the operations can be varied between embodiments, as would be apparent in light of this disclosure.

Referring to the method 900 of FIG. 9, an integrated circuit (IC) structure, such as an IC implementation of the clock distribution and alignment system 200) begins with receiving 910 a first clock signal (such as global clock signal 250) having a first frequency (such as 20 GHz), at a clock receiver circuit (such as clock receiver circuit 314) of each of a plurality of dispersed clock generators (such as local clock generators 210). The method 900 further includes dividing 920 the received first clock signal by a clock divider circuit (such as clock divider circuit 312) of each clock generator into a second clock signal (such as tuning clock signal 342) having a second frequency (such as 625 MHz) lower than the first frequency.

The method 900 further includes comparing 930, by a phase detector circuit (such as phase detector circuit 322) of each of a corresponding plurality of phase aligners (such as phase aligners 220), the phase of the second clock signal (such as tuning clock signal 342) of a respective one of the clock generators with the phase of the second clock signal (such as reference clock signal 344) of a respective other one of the clock generators. The method 900 further includes adjusting 940 the received first clock signal of the respective one of the clock generators by a clock adjuster circuit (such as clock adjuster circuit 324) of each phase aligner based on the compared phases of the second clock signals, to align the phases of the second clock signals. The method 900 further includes aligning 950 the phases of the second clock signals until the phases of the second clock signals of the dispersed clock generators are within a certain offset amount of each other. The offset amount can represent a tolerance, such as a small fraction (e.g., one-fourth, one-eighth, one-sixteenth, one-thirty-second, or the like) of the first (or global) clock signal pulse, for aligning the phases of the (locally) generated second clock signals. As such, the offset amount can be chosen so that local circuits driven by the corresponding second clock signals stay synchronized and functioning as intended across the system.

FIG. 10 is a flow diagram of an example method 1000 of adjusting a clock phase, such as for the method 900 of clock distribution and alignment of FIG. 9, according to an embodiment of the present disclosure. For example, method 1000 may be used to implement the adjusting 940 and aligning 950 operations of method 900. As such, reference in the method 1000 to the same named components of the method 900 may be implemented with the same circuits or structures referred to in the description of method 900.

Referring to the method 1000 of FIG. 10, processing begins with adjusting 1010, by a programmable gain (such as programmable gain 545) of each phase aligner, the sensitivity of the phase detector circuit so that the sensitivity of the phase detector circuit of one of the phase aligners is less than the sensitivity of the phase detector circuit of others of the phase aligners. The method 1000 further includes swallowing 1020 one or more pulses of the received first clock signal by the clock receiver circuit of the respective one of the clock generators according to a specified adjustment request from the clock adjuster circuit of the phase aligner, to align the phases of the second clock signals to within one first clock signal pulse. For example, the pulse swallowing 1020 may be part of a coarse adjustment of the clock phase of the second clock signal of each clock generator.

The method 1000 further includes a fine adjustment of the clock phase of the second clock signal of each clock generator. The fine adjustment includes generating 1030 in-phase and quadrature components of the received first clock signal at the clock receiver circuit of each clock generator. The fine adjustment further includes generating 1040 a plurality of delayed first clock signals at each clock receiver circuit by combining (or blending) the in-phase and quadrature components with a corresponding plurality of different amplitude adjustments for each of the in-phase and quadrature components. The fine adjustment further includes selecting 1050 one of the delayed first clock signals at each clock receiver circuit (for example, with multiplexer 630) according to a delay amount specified by the clock adjuster circuit of the corresponding phase aligner. For example, this fine adjusting of the phase of the second clock signal can take place at each clock receiver circuit to align the phases of the second clock signals to within a certain offset amount (such as a fraction of one first clock signal pulse, as in less than one half or one quarter of a first clock signal pulse).

Numerous other methods and techniques will be apparent in light of the present disclosure.

Further Example Embodiments

The following examples pertain to further embodiments, from which numerous permutations and configurations will be apparent.

Example 1 is a clock distribution and alignment system including: at least three clock generators, each including a clock receiver circuit to receive a first clock signal having a first frequency, and a clock divider circuit to divide the received first clock signal into a second clock signal having a second frequency lower than the first frequency, each of two or more of the clock generators further including a phase detector circuit to compare the phase of the second clock signal with the phase of the second clock signal of a next one of the clock generators, and a clock adjuster circuit to adjust the phase of the received first clock signal based on the compared phases of the second clock signals.

Example 2 includes the system of Example 1, wherein each of the two or more of the clock generators further includes a programmable gain to adjust sensitivity of the phase detector circuit.

Example 3 includes the system of Example 1, wherein the clock adjuster circuit is further to align the phases of the second clock signals to within a certain offset amount of each other.

Example 4 includes the system of Example 3, wherein the clock adjuster circuit aligns the phases of the second clock signals by specifying an adjustment request to the clock receiver circuit, and the clock receiver circuit adjusts the received first clock signal according to the specified adjustment request.

Example 5 includes the system of Example 4, wherein the clock receiver circuit in each of the two or more of the clock generators includes: a clock phase circuit to generate a plurality of delayed first clock signals from the received first clock signal; and a multiplexer to select one of the delayed first clock signals according to the specified adjustment request.

Example 6 includes the system of Example 5, wherein the clock phase circuit includes: a component generator circuit to generate in-phase and quadrature components of the received first clock signal; and a phase blender circuit to generate the plurality of delayed first clock signals by combining the in-phase and quadrature components with a corresponding plurality of different amplitude adjustments for each of the in-phase and quadrature components.

Example 7 includes the system of Example 4, wherein the clock receiver circuit in each of the two or more of the clock generators includes a pulse swallow circuit to swallow one or more pulses of the received first clock signal according to the specified adjustment request.

Example 8 includes the system of Example 1, wherein the second frequency is at least 500 megahertz (MHz) and the clock divider circuit divides the received first clock signal into a plurality of divided clock signals having corresponding frequencies that are multiples of the second frequency.

Example 9 includes the system of Example 1, wherein the phase detector circuit includes a bang-bang phase detector.

Example 10 is a method of clock distribution and alignment, the method including: receiving, at a clock receiver circuit of each of a plurality of dispersed clock generators, a first clock signal having a first frequency; dividing, by a clock divider circuit of each clock generator, the received first clock signal into a second clock signal having a second frequency lower than the first frequency; comparing, by a phase detector circuit of each of a corresponding plurality of phase aligners, the phase of the second clock signal of a respective one of the clock generators with the phase of the second clock signal of a respective other one of the clock generators; and adjusting, by a clock adjuster circuit of each phase aligner, the received first clock signal of the respective one of the clock generators based on the compared phases of the second clock signals, to align the phases of the second clock signals.

Example 11 includes the method of Example 10, further including for each phase aligner: adjusting, by a programmable gain of the phase aligner, sensitivity of the phase detector circuit so that the sensitivity of the phase detector circuit of one of the phase aligners is less than the sensitivity of the phase detector circuit of others of the phase aligners; and aligning the phases of the second clock signals until the phases of the second clock signals of the dispersed clock generators are within a certain offset amount of each other.

Example 12 includes the method of Example 10, wherein for each phase aligner, the adjusting of the received first clock signal includes specifying an adjustment request to the clock receiver circuit of the respective one of the clock generators, and the method further includes adjusting, by the clock receiver circuit of the respective one of the clock generators, the received first clock signal according to the specified adjustment request.

Example 13 includes the method of Example 12, wherein for each phase aligner, the adjusting of the received first clock signal includes: generating in-phase and quadrature components of the received first clock signal; generating a plurality of delayed first clock signals by combining the in-phase and quadrature components with a corresponding plurality of different amplitude adjustments for each of the in-phase and quadrature components; and selecting one of the delayed first clock signals according to the specified adjustment request.

Example 14 includes the method of Example 12, wherein for each phase aligner, the adjusting of the received first clock signal includes swallowing, by the clock receiver circuit of the respective one of the clock generators, one or more pulses of the received first clock signal according to the specified adjustment request.

Example 15 includes the method of Example 10, wherein for each of the dispersed clock generators, the second frequency is at least 500 megahertz (MHz) and the dividing of the received first clock signal includes dividing the received first clock signal into a plurality of divided clock signals having corresponding frequencies that are multiples of the second frequency.

Example 16 includes the method of Example 10, wherein for each phase aligner, the comparing of the phases of the second clock signals includes: consistently indicating which of the phases of the second clock signals is earlier than the other when the phases are offset by more than a certain offset amount; and alternately indicating which of the phases of the second clock signals is earlier than the other when the phases are offset by less than the certain offset amount, and the aligning of the phases of the second clock signals is to within the certain offset amount of each other.

Example 17 is a clock distribution and alignment system including: a plurality of dispersed clock generators each including a clock receiver circuit to receive and adjust a common first clock signal having a first frequency of at least 1 gigahertz (GHz), and a clock divider circuit to divide the received first clock signal into power-of-two-divided clock signals having corresponding power-of-two-divided frequencies the same as or lower than the first frequency, the divided clock signals including a second clock signal having a second frequency lower than the first frequency; a corresponding plurality of phase aligners each including a phase detector circuit to compare the phase of the second clock signal of a respective one of the clock generators with the phase of the second clock signal of a respective other one of the clock generators, and a clock adjuster circuit to use the clock receiver circuit of the respective one of the clock generators to adjust the received first clock signal of the respective one of the clock generators based on the compared phases of the second clock signals, to align the phases of the second clock signals; and wherein the phase aligners are configured to pairwise align the phases of the second clock signals of the dispersed clock generators until the phases of the second clock signals of the dispersed clock generators are within a certain offset amount of each other.

Example 18 includes the clock distribution and alignment system of Example 17, wherein the clock receiver circuit of each of the dispersed clock generators includes: a coarse adjustment circuit to swallow one or more pulses of the received first clock signal; and a fine adjustment circuit to delay the received first clock signal by a specified delay amount, each phase aligner further includes a programmable gain to adjust sensitivity of the phase detector circuit, and the clock adjuster circuit of each phase aligner adjusts the received first clock signal by using the coarse adjustment circuit of the respective one of the clock generators to align the phases of the second clock signals to within one said first clock signal pulse, and specifying the delay amount to the fine adjustment circuit of the respective one of the clock generators to align the phases of the second clock signals to within the certain offset amount, the certain offset amount being less than half the first clock signal pulse.

Example 19 includes the clock distribution and alignment system of Example 18, wherein the fine adjustment circuit of the each of the dispersed clock generators includes: a component generator circuit to generate in-phase and quadrature components of the received first clock signal; a phase blender circuit to generate a plurality of delayed first clock signals by combining the in-phase and quadrature components with a corresponding plurality of different amplitude adjustments for each of the in-phase and quadrature components; and a multiplexer to select one of the delayed first clock signals according to the specified delay amount.

Example 20 includes the clock distribution and alignment system of Example 17, wherein the certain offset amount is a first offset amount, and for each phase aligner, the phase detector circuit includes a bang-bang phase detector to: consistently indicate which of the phases of the second clock signals is earlier than the other when the phases are offset by more than a second offset amount, the second offset amount being smaller than the first offset amount; and alternately indicate which of the phases of the second clock signals is earlier than the other when the phases are offset by less than the second offset amount, and the clock adjuster circuit aligns the phases of the second clock signals to within the second offset amount of each other.

Example 21 is a clock distribution and alignment system including: a plurality of dispersed clock generators including a first clock generator and a second clock generator, each of the dispersed clock generators including a clock receiver circuit to receive a first clock signal having a first frequency, and a clock divider circuit to divide the received first clock signal into a second clock signal having a second frequency lower than the first frequency; and a phase aligner including a phase detector circuit to compare the phase of the second clock signal of the first clock generator with the phase of the second clock signal of the second clock generator, and a clock adjuster circuit to adjust the received first clock signal of the first clock generator based on the compared phases of the second clock signals, to align the phases of the second clock signals.

Example 22 includes the system of Example 21, wherein the plurality of dispersed clock generators further includes a third clock generator, the phase aligner is a first phase aligner, and the system further includes a second phase aligner including: a phase detector circuit to compare the phase of the second clock signal of the second clock generator with the phase of the second clock signal of the third clock generator, and a clock adjuster circuit to adjust the received first clock signal of the second clock generator based on the compared phases of the second clock signals of the second and third clock generators, to align the phases of the second clock signals of the second and third clock generators.

Example 23 includes the system of Example 22, further including a corresponding plurality of phase aligners including the first phase aligner and the second phase aligner, wherein each of the plurality of phase aligners includes: a phase detector circuit to compare the phase of the second clock signal of a respective one of the dispersed clock generators with the phase of the second clock signal of a respective other one of the dispersed clock generators; a clock adjuster circuit to adjust the received first clock signal of the respective one of the dispersed clock generators based on the compared phases of the second clock signals of the respective one and the respective other one of the dispersed clock generators, to align the phases of the second clock signals of the respective one and the respective other one of the dispersed clock generators; and a programmable gain to adjust sensitivity of the phase detector circuit, wherein the plurality of phase aligners pairwise aligns the phases of the second clock signals of the dispersed clock generators until the phases of the second clock signals of the dispersed clock generators are within a certain offset amount of each other.

Example 24 includes the system of Example 21, wherein the clock adjuster circuit adjusts the received first clock signal by specifying an adjustment request to the clock receiver circuit of the first clock generator, and the clock receiver circuit of the first clock generator adjusts the received first clock signal according to the specified adjustment request.

Example 25 includes the system of Example 24, wherein the clock receiver circuit of the first clock generator includes: a clock phase circuit to generate a plurality of delayed first clock signals from the received first clock signal; and a multiplexer to select one of the delayed first clock signals according to the specified adjustment request.

Example 26 includes the system of Example 25, wherein the clock phase circuit of the clock receiver circuit of the first clock generator includes: a component generator circuit to generate in-phase and quadrature components of the received first clock signal; and a phase blender circuit to generate the plurality of delayed first clock signals by combining the in-phase and quadrature components with a corresponding plurality of different amplitude adjustments for each of the in-phase and quadrature components.

Example 27 includes the system of Example 24, wherein the clock receiver circuit of the first clock generator includes a pulse swallow circuit to swallow one or more pulses of the received first clock signal according to the specified adjustment request.

Example 28 includes the system of Example 21, wherein for each of the dispersed clock generators, the second frequency is at least 500 megahertz (MHz) and the clock divider circuit divides the received first clock signal into a plurality of divided clock signals having corresponding frequencies that are multiples of the second frequency.

Example 29 includes the system of Example 21, wherein the phase detector circuit includes a bang-bang phase detector to consistently indicate which of the phases of the second clock signals is earlier than the other when the phases are offset by more than a certain offset amount, and alternately indicate which of the phases of the second clock signals is earlier than the other when the phases are offset by less than the certain offset amount, and the clock adjuster circuit aligns the phases of the second clock signals of the first and second clock generators to within the certain offset amount of each other.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. In addition, various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A clock distribution and alignment system comprising:
   a plurality of clock generators, each comprising:
      a clock receiver circuit to receive a global clock signal having a first frequency, and
      a clock divider circuit to divide the received global clock signal into at least one local clock signal having a frequency lower than the first frequency, wherein one of the at least one local clock signal is a tuning clock signal; and
   a corresponding plurality of phase aligners, wherein each of the phase aligners are coupled to a respective one of the clock generators in a control loop, the phase aligners comprising:
      a phase detector circuit to compare a phase of the tuning clock signal with a reference phase from a reference local clock signal from a different one of the local clock generators, and
      a clock adjuster circuit to adjust the tuning clock signal based on result of the compared phase from the reference local clock signal, to align the phase of the tuning clock signal.

2. The system of claim 1 wherein each of the plurality of phase aligners further includes a programmable gain to adjust sensitivity of the phase detector circuit.

3. The system of claim 1 wherein the clock adjuster circuit aligns the phase of the tuning clock signal to within a certain offset amount of each other.

4. The system of claim 3, wherein the clock adjuster circuit aligns the phase of the tuning clock signal by specifying an adjustment request to the clock receiver circuit, and the clock receiver circuit adjusts the received global clock signal according to the specified adjustment request.

5. The system of claim 4, wherein the clock receiver circuit comprises:
   a clock phase circuit to generate a plurality of delayed global clock signals from the received global clock signal; and
   a multiplexer to select one of the delayed global clock signals according to the specified adjustment request.

6. The system of claim 5, wherein the clock phase circuit comprises:
   a component generator circuit to generate in-phase and quadrature components of the received global clock signal; and
   a phase blender circuit to generate the plurality of delayed global clock signals by combining the in-phase and quadrature components with a corresponding plurality of different amplitude adjustments for each of the in-phase and quadrature components.

7. The system of claim 4, wherein the clock receiver circuit comprises a pulse swallow circuit to swallow one or more pulses of the received global clock signal according to the specified adjustment request.

8. The system of claim 1 wherein the second frequency is at least 500 megahertz (MHz) and the clock divider circuit divides the received global clock signal into a plurality of divided clock signals having corresponding frequencies that are multiples of the second frequency.

9. The system of claim 1 wherein the phase detector circuit comprises a bang-bang phase detector.

10. A method of clock distribution and alignment, the method comprising:
    receiving, at a clock receiver circuit of each of a plurality of dispersed clock generators, a first clock signal having a first frequency;
    dividing, by a clock divider circuit of each clock generator, the received first clock signal into a second clock signal having a second frequency lower than the first frequency;
    comparing, by a phase detector circuit of each of a corresponding plurality of phase aligners, the phase of the second clock signal of a respective one of the clock generators with the phase of the second clock signal of a respective other one of the clock generators; and adjusting, by a clock adjuster circuit of each phase aligner, the received first clock signal of the respective one of the clock generators based on the compared phases of the second clock signals, to align the phases of the second clock signals.

11. The method of claim 10, further comprising for each phase aligner:
adjusting, by a programmable gain of the phase aligner, sensitivity of the phase detector circuit so that the sensitivity of the phase detector circuit of one of the phase aligners is less than the sensitivity of the phase detector circuit of others of the phase aligners; and
aligning the phases of the second clock signals until the phases of the second clock signals of the dispersed clock generators are within a certain offset amount of each other.

12. The method of claim 10, further comprising for each phase aligner,
adjusting, by the clock receiver circuit of the respective one of the clock generators, the received first clock signal according to a specified adjustment request, wherein for each phase aligner, the adjusting of the received first clock signal comprises specifying the adjustment request to the clock receiver circuit of the respective one of the clock generators.

13. The method of claim 12, wherein for each phase aligner, the adjusting of the received first clock signal comprises:
generating in-phase and quadrature components of the received first clock signal;
generating a plurality of delayed first clock signals by combining the in-phase and quadrature components with a corresponding plurality of different amplitude adjustments for each of the in-phase and quadrature components; and
selecting one of the delayed first clock signals according to the specified adjustment request.

14. The method of claim 12, wherein for each phase aligner, the adjusting of the received first clock signal comprises swallowing, by the clock receiver circuit of the respective one of the clock generators, one or more pulses of the received first clock signal according to the specified adjustment request.

15. The method of claim 10, wherein for each of the dispersed clock generators, the second frequency is at least 500 megahertz (MHz) and the dividing of the received first clock signal comprises dividing the received first clock signal into a plurality of divided clock signals having corresponding frequencies that are multiples of the second frequency.

16. The method of claim 10, wherein for each phase aligner,
the comparing of the phases of the second clock signals comprises:
consistently indicating which of the phases of the second clock signals is earlier than the other when the phases are offset by more than a certain offset amount; and
alternately indicating which of the phases of the second clock signals is earlier than the other when the phases are offset by less than the certain offset amount, and
the aligning of the phases of the second clock signals is to within the certain offset amount of each other.

17. A clock distribution and alignment system comprising:
a plurality of dispersed clock generators each including
a clock receiver circuit to receive and adjust a common first clock signal having a first frequency of at least 1 gigahertz (GHz), and
a clock divider circuit to divide the received first clock signal into power-of-two-divided clock signals having corresponding power-of-two-divided frequencies the same as or lower than the first frequency, the divided clock signals including a second clock signal having a second frequency lower than the first frequency;
a corresponding plurality of phase aligners each including
a phase detector circuit to compare the phase of the second clock signal of a respective one of the clock generators with the phase of the second clock signal of a respective other one of the clock generators, and
a clock adjuster circuit to use the clock receiver circuit of the respective one of the clock generators to adjust the received first clock signal of the respective one of the clock generators based on the compared phases of the second clock signals, to align the phases of the second clock signals; and
wherein the phase aligners are configured to pairwise align the phases of the second clock signals of the dispersed clock generators until the phases of the second clock signals of the dispersed clock generators are within a certain offset amount of each other.

18. The clock distribution and alignment system of claim 17, wherein
the clock receiver circuit of each of the dispersed clock generators comprises:
a coarse adjustment circuit to swallow one or more pulses of the received first clock signal; and
a fine adjustment circuit to delay the received first clock signal by a specified delay amount,
each phase aligner further includes a programmable gain to adjust sensitivity of the phase detector circuit, and
the clock adjuster circuit of each phase aligner adjusts the received first clock signal by
using the coarse adjustment circuit of the respective one of the clock generators to align the phases of the second clock signals to within one said first clock signal pulse, and
specifying the delay amount to the fine adjustment circuit of the respective one of the clock generators to align the phases of the second clock signals to within the certain offset amount, the certain offset amount being less than half the first clock signal pulse.

19. The clock distribution and alignment system of claim 18, wherein the fine adjustment circuit of the each of the dispersed clock generators comprises:
a component generator circuit to generate in-phase and quadrature components of the received first clock signal;
a phase blender circuit to generate a plurality of delayed first clock signals by combining the in-phase and quadrature components with a corresponding plurality of different amplitude adjustments for each of the in-phase and quadrature components; and
a multiplexer to select one of the delayed first clock signals according to the specified delay amount.

20. The clock distribution and alignment system of claim 17, wherein the certain offset amount is a first offset amount, and for each phase aligner, the phase detector circuit comprises a bang-bang phase detector to:
consistently indicate which of the phases of the second clock signals is earlier than the other when the phases are offset by more than a second offset amount, the second offset amount being smaller than the first offset amount; and
alternately indicate which of the phases of the second clock signals is earlier than the other when the phases are offset by less than the second offset amount, and the clock adjuster circuit aligns the phases of the second clock signals to within the second offset amount of each other.

* * * * *